J. Dean. Hop Picker.

No. 75,385

PATENTED
MAR 10 1868

Witnesses
H. C. Ashkettle
Theo Inahl

Inventor
J. Dean
per Munn & Co.
Attorneys

United States Patent Office.

JOHN DEAN, OF BARABOO, WISCONSIN.

Letters Patent No. 75,385, dated March 10, 1868.

IMPROVEMENT IN HOP-PICKING TOOL.

*The Schedule referred to in these Letters Patent and making part of the same.*

TO ALL WHOM IT MAY CONCERN:

Be it known that I, JOHN DEAN, of Baraboo, in the county of Sauk, and State of Wisconsin, have invented a new and improved Hop-Picking Tool; and I do hereby declare that the following is a full, clear, and exact description thereof, which will enable others skilled in the art to make and use the same, reference being had to the accompanying drawings forming part of this specification, in which—

Similar letters of reference indicate corresponding parts.

This invention relates to a new device for picking hops from the pole, and consists in the use of a rake, with curved tines, and with cutters at the ends, which serve to cut the vines as the tool is drawn along the pole. The tines are either brought close together, or they are of peculiar shape, so as to prevent the hops from falling through between them.

Figure 1:
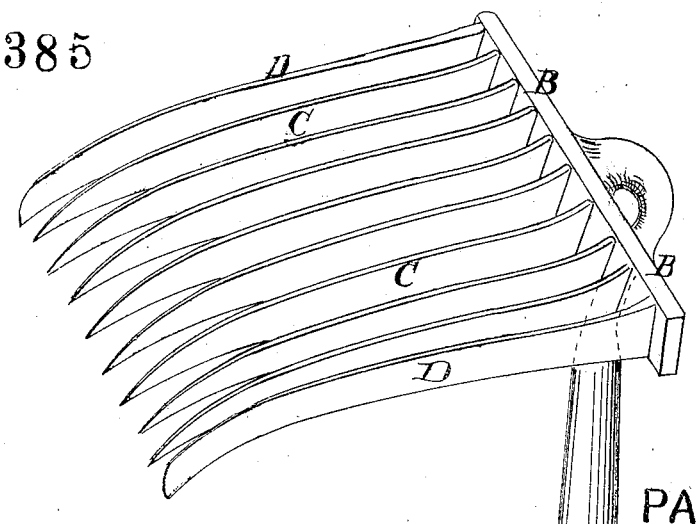
Figure 1 represents a perspective view of my improved hop-picking machine.

A, in the drawing, represents the handle of my improved hop-picker. B is the rake-head, attached in any suitable manner to the handle, and carrying a number of teeth or tines, C C. The teeth C are curved as shown in fig. 1, and are of suitable size, and a suitable number of them is employed. At each end of the head B is secured, about parallel with the tines C, a cutter, D, as shown. As the tool is drawn along a pole, the tines will rake off the hops, while the cutters will sever the vines that are in the way of the tool. The hops, thus picked off the poles, are thrown with the cut-off vines upon a carpet or mat, and then separated through a sieve.

Figure 2:
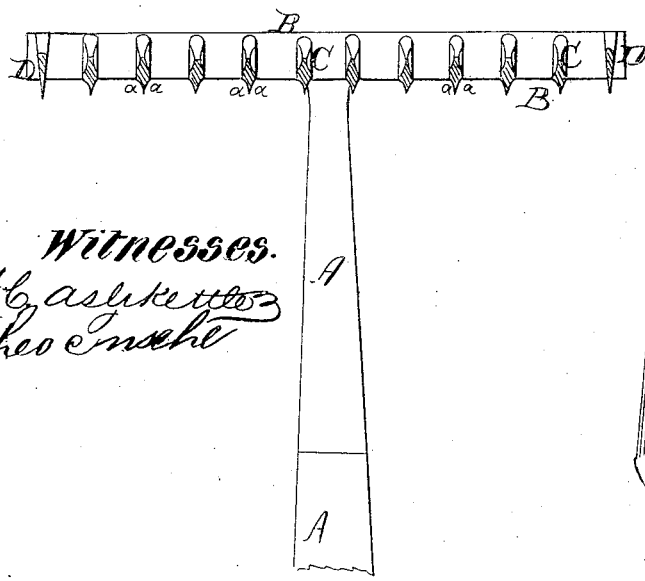
Figure 2 is a transverse section of the same.

The teeth C may be of suitable cross-section, but that indicated in fig. 2, I consider preferable. In that the cross-section is somewhat diamond-shaped, the two front sides being somewhat concave, as at $a\,a$; thereby the hops are retained on the front of the instrument, and will not be so easily drawn through the same.

Having described my invention, I claim as new, and desire to secure by Letters Patent—

1. A hop-picking instrument, consisting of a rake, having curved teeth C and cutters D D at the ends, substantially as herein shown and described.

2. The diamond-shaped teeth C, with concave front edges, substantially as and for the purpose herein shown and described.

JOHN DEAN.

Witnesses:
WM. F. McNAMARA,
ALEX. F. ROBERTS.